Dec. 7, 1943.  C. J. MALM  2,336,273
PRODUCTION OF LAMINATED STRUCTURES
Filed May 8, 1939

Inventor
Carl J. Malm
N. M. Perrins
By Daniel J. Mayne
Attorneys

Patented Dec. 7, 1943

2,336,273

UNITED STATES PATENT OFFICE 2,336,273

PRODUCTION OF LAMINATED STRUCTURES

Carl J. Malm, Rochester, N. Y., assignor to Eastman Kodak Company, Rochester, N. Y., a corporation of New Jersey Application May 8, 1939, Serial No. 272,353

1 Claim. (Cl. 154—2.80)

This invention relates to the manufacture of laminated structures, and more particularly to the lamination of sheets or layers of normally incompatible cellulose organic derivatives. The invention relates specifically to the manufacture of a special type of laminated glass in which such laminated structures may be employed as the interlayer.

As is well known, sheets or layers of different cellulose organic derivatives, particularly the cellulose organic acid esters, are normally incompatible from the standpoint of adherence, it having been found that the more the cellulose derivative material differs in its chemical nature from the material to which it is to be caused to adhere, the more difficult it is to obtain a proper bond between the layers. In many applications of the cellulose organic acid esters, for example, it is desired to laminate or bond a sheet of one cellulose ester to another, but until the advent of the present invention it has been impossible to obtain a sufficient bond between the two materials of widely different chemical constitution, such for example, as cellulose acetate and cellulose acetate butyrate, to render the laminated material adaptable for commercial applications, as in the manufacture of laminated glass and other products.

This invention has as its principal object to overcome the above mentioned difficulties and to provide a means whereby sheets or layers of normally incompatible cellulose derivatives may be laminated to produce a composite structure having a sufficient degree of strength and other desirable qualities to render it adaptable for use in various commercial applications, particularly in laminated glass structures. A further object is to provide a strongly bonded laminated sheet composed of two sheets or layers of cellulose organic acid ester material of widely differing chemical constitution. A still further object is to provide an improved laminated glass in which the inner layer of plastic material may be composed of a plurality of sheets or layers of cellulose organic derivatives of differing chemical constitution. A specific object is to provide an improved laminated glass having light polarizing properties. Other objects will appear hereinafter.

These objects are accomplished by the following invention which, in its broader aspects, comprises bonding together two sheets of cellulose organic derivative material which are normally incompatible from the standpoint of adherence by means of a series of layers composed of cellulose organic esters, the ester of each layer being compatible with the ester of the previous layer and approaching in compatibility with the ester of the sheet to be bonded to the sheet to which the layers are applied, the ester in the last layer of the series being compatible with the sheet to be bonded thereto. Preferably, each of the layers of the series is hydrolyzed to a less degree than the preceding layer, although the opposite may be the case. For example, if it is desired to laminate a sheet of cellulose acetate to a sheet of cellulose acetate butyrate, the sheet of cellulose acetate is coated with a thin layer of cellulose acetate butyrate containing a small amount of butyryl. The resulting coating is then coated with another thin layer of a cellulose acetate butyrate containing a slightly higher percentage of butyryl than the preceding layer, and so on through a series of layers of esters containing progressively more butyryl until one arrives at a cellulose acetate butyrate which is sufficiently compatible with the cellulose acetate butyrate sheet to render it capable of being firmly bonded to the cellulose acetate sheet by means of heat and pressure and/or solvents. This series of layers may be termed, in the case of cellulose acetate butyrate, as a "cellulose acetate butyrate bridge." It will thus be seen that this composite series of layers makes possible the lamination of two widely differing and normally incompatible sheets without difficulty, a result which was hitherto impossible.

This invention is extremely valuable in the manufacture of laminated glass in which it is desired to employ sheets or layers of two different cellulose esters, for example, sheets of cellulose acetate butyrate or other cellulose mixed organic acid esters bonded to the glass surface, and then bond these sheets in turn to an inner sheet of cellulose acetate or other ester.

In the following examples and descriptions I have set forth several of the preferred embodiments of my invention, but they are included merely for purposes of illustration and not as a limitation thereof.

In the accompanying drawing.

Figure 3:
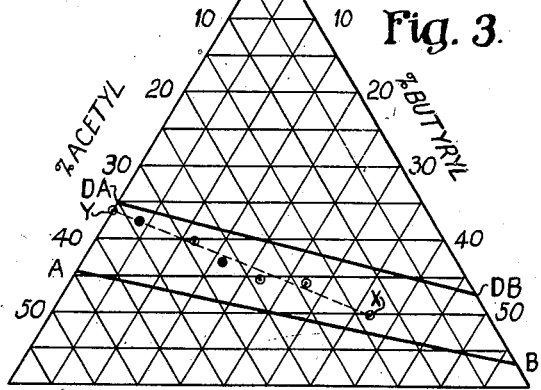

My invention will be more readily understood by reference to Fig. 3 of the drawing which is a triangular diagram illustrating the cellulose esters containing various amounts of acetyl and butyryl. The composition in percentage acetyl is plotted along the CA axis and the percentage of butyryl along the CB axis. The point at about 44.8% on the CA axis designates cellulose triacetate, while the point at 57.3% on the CB axis designates cellulose tributyrate. A line connecting these points will indicate all fully esterified cellulose acetate butyrates of varying ratios of the two acyl groups. Points of lower total acyl values than these represent partially hydrolyzed esters. Similarly, the point DA represents the di-ester, cellulose di-acetate while the point DB indicates cellulose di-butyrate, while the line connecting these two points indicates diesters of varying ratios of the two acyl groups.

Taking the case where it is desired, for example, to laminate a sheet of cellulose acetate containing 36.5% acetyl (Y) to a sheet of cellulose acetate butyrate containing 13% acetyl and 37% butyryl, the composition of the ester contained in the latter sheet being represented by the point X on the triangular diagram. We have found that a series of esters of intermediate composition between the points Y and X may be employed in accordance with the invention above set forth to form a series of layers of progressively differing composition, the ester of each layer being compatible with the ester of the previous layer. A suitable series of such layers may have the following indicated compositions:

| Sheet | Per cent acetyl | Per cent butyryl |
| --- | --- | --- |
| A. Cellulose acetate (to be laminated to G) | 36.5 | 0   (Y) |
| B. Cellulose acetate butyrate | 34 | 4.7 |
| C. Cellulose acetate butyrate | 29 | 11.5 |
| D. Cellulose acetate butyrate | 27 | 16.0 |
| E. Cellulose acetate butyrate | 23 | 22.0 |
| F. Cellulose acetate butyrate | 18.5 | 28.0 |
| G. Cellulose acetate butyrate | 13.0 | 37.0 (X) |

It will be seen from the above table that, once one knows the composition of the cellulose acetate sheet and that of the cellulose acetate butyrate sheet it is desired to laminate thereto, a straight line may be drawn between the points on the diagram of Fig. 3 corresponding to these compositions and, in accordance with my invention, an appropriate series of esters varying progressively in the ratio of acetyl to butyryl may be selected, the particular series illustrated in the table corresponding to the points indicated as lying in the approximate vicinity of the line Y—X.

As indicated above, I prefer to employ esters which have been less hydrolyzed as one progresses from cellulose acetate toward the cellulose acetate butyrate in question, although the reverse may be the case and yet obtain satisfactory results.

While I have chosen to illustrate my invention by reference to the lamination of sheets of cellulose acetate to sheets of cellulose acetate butyrate, I may use various other combinations, such as cellulose acetate to cellulose propionate, cellulose acetate to cellulose stearate, etc. In fact, an almost infinite number of combinations may be successfully effected in accordance with the principles of my invention as set forth herein.

Figure 1:
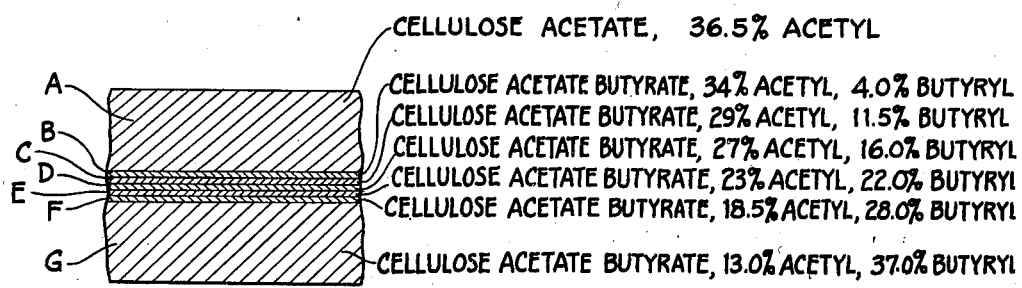
Fig. 1 is a section, in greatly exaggerated scale, through one type of laminated structure prepared in accordance with the invention.

My invention will be further understood by reference to Fig. 1 which illustrates a typical laminated structure produced from two normally incompatible sheets of cellulose organic acid ester material. Sheet A is composed of cellulose acetate containing 36.5 acetyl, while sheet G is composed of cellulose acetate butyrate containing 13% acetyl and 37% butyryl. As is well known, these two materials are absolutely incompatible and may not be caused to adhere together by lamination under the influence of heat and pressure and/or the use of solvents. However, in accordance with my invention, I apply to sheet A a thin coating or layer of cellulose acetate butyrate containing 34% acetyl and 4% butyryl. This latter material may be applied from solution in any appropriate solvent such as acetone, or from various combinations of acetone with other solvents or non-solvents by any convenient technique known to those skilled in the art, such as spraying, bead or roll application and the like. After appropriate drying a second layer, C, composed of cellulose acetate butyrate containing 29% acetyl and 11.5% butyryl is deposited on layer B in a similar manner. This is followed by the successive application of layer D composed of cellulose acetate butyrate containing 27% acetyl and 16% butyryl, layer E composed of cellulose acetate butyrate containing 23% acetyl and 22% butyryl, and layer F composed of cellulose acetate butyrate containing 18.5% acetyl and 28% butyryl. The coated sheet A is then brought in contact with sheet G to which it is desired to laminate the acetate sheet and lamination accomplished by means of heat and pressure, with or without the use of solvents, in a well-known manner.

Figure 2:
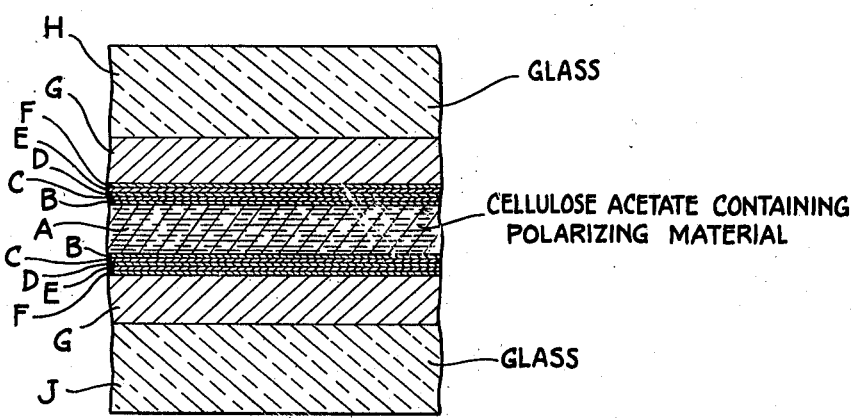
Fig. 2 is a section, also in exaggerated scale, through a laminated glass structure showing a typical industrial application of the laminated structures of my invention.

Another application of my invention is illustrated in Fig. 2. H and J represent two sheets of glass bonded together by means of the composite inner layer composed of the inner cellulose acetate sheet A which, in turn, is firmly bonded to sheets of cellulose acetate butyrate G by means of the series of thin layers B, C, D, E, and F as in Fig. 1. In the form of my invention illustrated in Fig. 2 the cellulose acetate sheet A has dispersed therein crystals of a polarizing material which give the finished glass anti-glare properties.

My invention is particularly valuable in the manufacture of laminated glass of the type just referred to, since it has been found, on the one hand, that cellulose acetate is the most satisfactory material for the dispersion of the polarizing material, while on the other hand, sheets composed of the cellulose mixed organic acid esters are stronger, have high moisture resistance, require less plasticizer, are less subject to distortion, and have various other properties which make them superior to sheets composed of cellulose acetate or other single esters of cellulose.

It will be evident that many modifications of the above may be made within the scope of my invention. For example, I may laminate plasticized or unplasticized sheets of cellulose organic esters of differing chemical constitution. Likewise, I may laminate a sheet or sheets of unplasticized cellulose acetate butyrate, for example, to a sheet or sheets of highly plasticized cellulose acetate or vice versa. While I have chosen to illustrate my invention by reference to the manufacture of sheeting suitable for the manufacture of laminated glass and similar products, it may be equally well applied to the manufacture of opaque, translucent, colored or decorative materials.

My invention has many other applications in the manufacture of laminated sheeting. For example, if one wishes to obtain a sheeting having high tensile strength and at the same time high flexibility, a sheet of cellulose tri-acetate may be laminated in accordance with my invention to a sheet of cellulose acetate stearate. Likewise, if one wishes to obtain a highly flexible sheet which at the same time has a hard, scratch-proof surface, one may laminate a sheet of cellulose acetate to both sides of a sheet of high butyryl cellulose acetate butyrate. Both of these and many similar combination, which were utterly impossible before the advent of my invention, may now be accomplished without difficulty.

What I claim is:

A laminated cellulose organic acid ester sheet consisting of at least two sheets, the first sheet being composed of a cellulose organic acid ester and a second sheet composed of a cellulose organic acid ester material which is incompatible with the cellulose organic acid ester material of the first sheet, the first sheet being bonded to the second sheet by means of an interposed, laminated cellulose ester bridge consisting of a series of layers, each layer in the series containing the same acyl groups, but the respective layers varying in composition progressively from layer to layer by virtue of the fact that the ratio of the different acyl groups varies progressively from layer to layer, the ester of each layer being compatible with both the ester of the preceding layer and with the ester of the next following layer, the layer next to the first sheet being bonded thereto and of a composition which is compatible therewith and the layer next to the second sheet being bonded thereto and of a composition which is compatible with that sheet.

CARL J. MALM.